Patented Feb. 1, 1927.

1,616,192

UNITED STATES PATENT OFFICE.

AUGUST MARKS, OF CARTERET, NEW JERSEY, ASSIGNOR TO UNITED STATES METALS REFINING COMPANY, OF MIDDLESEX COUNTY, NEW JERSEY, A CORPORATION OF NEW JERSEY.

UNBURNED REFRACTORY BRICK AND METHOD OF MAKING IT.

No Drawing.   Application filed May 6, 1926.   Serial No. 107,307.

This invention relates to molded magnesite refractories (that is, refractories made from magnesitic material, being composed wholly or largely of magnesite) and to a method of making the same.

The present application is in part a division and continuation of my application No. 754,983, filed December 10, 1924. (Said application has been substituted by a continuing application No. 114,566, filed June 8, 1926.).

Magnesite bricks and other similar refractories are commonly made by thoroughly mixing the ground dead-burned magnesite with water, molding, and prolonged burning in a kiln. Such bricks have many desirable qualities, but have the serious disadvantages of cracking and spalling at high temperatures, and of considerable absorption of molten metals. They require to be kiln-fired before they can be safely handled, transported, or built into a furnace or other place of use.

The present invention provides an unburned brick or other shape wherein the magnesite is bonded with linseed oil or other suitable oil, molded, and then dried to hardness, after which it can be handled and transported as well as the standard water-bonded and kiln-fired brick, and which when built into a furnace or other place of use becomes fired by the heat therein and thereby acquires qualities superior to those of the standard magnesite bricks heretofore used.

According to the present invention the magnesitic body material is pulverized and otherwise prepared according to any suitable or known method for use in the manufacture of refractories.

The body material is then mixed with a suitable oil, preferably a siccative vegetable oil, such as linseed oil, to form a plastic mass, being preferably well mixed or kneaded, as is usual in the preparation of the plastic for molding bricks, etc.

The plastic mass is then molded into forms or shapes as may be desired, as, for example, bricks, lining tiles, etc., the molding being preferably effected or completed under pressure in a hydraulic press.

The bricks, etc. after molding are then subjected to a gradual drying process. With the use of a siccative oil the drying takes place only partly, if at all, by vaporization, and mainly by oxidation or other chemical change within the oil, whereby it solidifies and becomes a solid and permanent bond for the particles of magnesite. There is also apparently a chemical combination between the oil and the body material, or portions thereof, which may be a saponifying action; or there may be other chemical reactions the nature of which is not yet fully understood, but during which the products resulting from the solidification of the oil and its union with the particles of magnesite afford a strong and permanent bond between these particles. This hardening proceeds to some extent progressively from the surface inward, and might occur somewhat unequally if the surface were to harden and become impermeable materially in advance of the interior. It is therefore desirable to retard the surface drying so as to give time for the interior drying to take place in order thereby to maintain as nearly as possible a homogeneous condition throughout the brick. Thus, while under some circumstances the drying or hardening of the bricks may successfully be accomplished in the open air, it is preferable to perform the drying in the following manner:

If the bricks on removal from the molds are too soft to be safely handled, it is best to first leave them undisturbed to partly dry in the air; this need take but a very few hours in any case, and is needless when the bricks after molding are reasonably firm. The bricks are then placed in any suitable known humidifying dryer, where they are first subjected to a moist atmosphere and moderate heat, and gradually to dryer air and higher heat, until they are fully dried; the total period of drying will vary according to circumstances, but will ordinarily take from 60 to 80 hours. At the end of this drying operation the brick is firm and dense, and to all appearances dried. It is, however, desirable to thereafter subject the bricks to a somewhat prolonged drying in the open air. This air drying may continue for several days, or as long as is convenient.

The bricks thus produced have been dried to hardness, that is to say, they are perfectly dry and appear to be substantially as hard and dense as ordinary water-bonded bricks which have been burned. Under test they exhibit a considerable approach toward the strength of the ordinary burned magnesite brick. Their strength is sufficient to enable them to be handled and transported (by rail or otherwise) with substantially the same freedom from breakage as the ordinary water-bonded and kiln-fired magnesite bricks.

These unburned bricks are designed to be built into a furnace or converter, or other metallurgical unit, as the lining thereof. The bricks become fired in the furnace and this firing proceeds progressively from the exposed face through the bricks to the backing. In course of time the firing effect becomes substantially or nearly homogeneous. For most purposes it is desirable in the first firing of such furnaces, or the first use of converters or other vessels lined with these bricks, to apply the heat moderately and gradually increase it, rather than running up rapidly to the most intense heat used in actual practice.

By the observance of this precaution (and in some instances even without it) the unburned bricks according to the present invention will be found to afford substantially the same advantages and service as the best burned magnesite bricks. The expense and delay of the usual kiln firing (commonly requiring about ten days) are saved, since the proper burning of the bricks is accomplished by the normal heating up of the furnace or other metallurgical unit. In starting any such metallurgical furnace it is the practice to heat it up gradually, and not to introduce molten metal until the heating has been sufficiently prolonged and the temperature has been carried sufficiently high to properly prepare the furnace for metallurgical treatment; and such preparatory heating is sufficient to accomplish the proper burning of the previously unburned bricks. Accordingly, the present invention utilizes this preliminary heating up in place of requiring previous kiln firing of the bricks. This would be impossible with the standard water-bonded magnesite bricks because they are too fragile and brittle to be safely handled or transported, so that they require kiln firing in order to enable them to be transported to the place of use and properly built into the furnaces or other units. Thus the water-bonded bricks pass in reality through a double firing, the first time in the kiln, and secondly, after having been built in as the lining of a furnace, converter, etc., during the preliminary heating up of such unit. The present invention thus accomplishes an important economy.

The bricks made according to the present invention, after having been thus fired during the gradual heating up of the metallurgical unit, present important advantages over the ordinary magnesite bricks made by water-bonding and kiln burning; they are less liable to expansion when heated to high temperatures, they crack and spall much less than the standard bricks, and they are denser and more impervious to penetration by molten metals such as copper, than the ordinary water-bonded bricks, and they have greater resistance to the corroding action of molten metal and hot gases.

The oil-bonded and dried bricks according to the present invention may be burned, if desired, in the usual way, instead of being put into use without previous burning; but the present invention is complete when the bricks have become thoroughly dried by siccative action as described.

In practicing the process the following specific operations may be performed:

Dead-burned magnesite (magnesite rock burned to drive off the carbon dioxid contained therein and to reduce the magnesia to crystalline form), preferably of the Austrian variety, or in equal parts of Austrian or other suitable imported magnesite and American magnesite, is preferably first dried by heating to drive off such moisture as may be contained therein, and is then finely ground. In practice the burned magnesite is ground to a fineness such that it will pass a screen of 40 mesh per lineal inch, and a large proportion will pass through a screen of 100 mesh per lineal inch. In general, the finer the size of the ground particles the better will be the refractory produced. It is, however, desirable to grind or mix or blend the magnesite in such manner that a suitable proportion of it is ground to an extremely fine impalpable powder, while another proportion is somewhat more coarsely ground. This result is readily attained by the common methods of grinding if the process is conducted skilfully to that end; the result of this is that the finer particles enter what would otherwise be voids left between the coarser particles, and thereby form a plastic mass of greater density. A typical screen analysis of a suitable mix would give approximately 40 per cent not passing through a 60 mesh screen, about 45 per cent passing a 100 mesh screen, and the difference in intermediate sizes.

Raw linseed oil is then added to the ground burned magnesite and thoroughly mixed in a mixing pan or "wet pan" until a thoroughly plastic mass suitable for molding is produced. This mixing or pugging operation takes ordinarily from one and one-half to three times as long as in the mixing of the plastic mass for water-bonded magnesite bricks. While the amount of oil used may vary somewhat, in practice excellent results are secured by using from five to seven pounds of oil per 100 pounds of magnesite; or, for example, one gallon of oil to about 120 pounds of magnesite. The best amount of oil may vary with the quality of the oil, the fineness of the grinding of the magnesite, and the quality or origin of the magnesite. Generally, if less than 3 or 4 per cent of oil is used, or if more than 9 per cent is used, failure will result. The plastic mass thus prepared is then put into forms or molds and subjected to pressure in a hydraulic press.

The drying operation is then performed. If not too soft for safe handling, the bricks may be put at once into a suitable dryer in which the air is humidified in the initial stage, and progressively less humid as the drying proceeds, the final drying being accomplished with dry air. The temperature is also gradually increased as the drying proceeds. A dryer in the form of a tunnel having carriers on which the bricks are conveyed slowly through the tunnel, is suitable; such dryers are well known in the art. Some suitable means should be provided for regulating the humidity of the air in the successive portions or zones of the dryer, and for regulating the heat therein preferably independently of the humidity. As an example of a successful drying operation, assuming a dryer with three successive chambers in which the bricks are successively exposed, the drying conditions may be as follows:

| Chamber No. | Hours. | Dry bulb. | Wet bulb. | Per cent saturation. |
|---|---|---|---|---|
|  |  | °F. | °F. |  |
| 1 | 20 | 100 | 90 | 68 |
| 2 | 25 | 110 | 90 | 46 |
| 3 | 30 | 120 | Dry | 0 |

In the above example the bricks are under drying treatment for 75 hours. They are then taken from the dryer and stacked on edge separate from one another, so that they are exposed on all sides except the bottom, to the air. This final air drying is not ordinarily necessary, but is desirable, and the bricks may be thus exposed for a few days or as long as it is convenient to store them in this manner.

At the end of the period of drying in the dryer as described, and even without the subsequent air drying, the brick is firm and dense and to all appearances dried. During the drying, the hardening of the brick by the siccative action of the oil continues progressively until the brick has become thoroughly dry and hard all through.

The oil used may be linseed oil, either raw or boiled, or it may be any linseed oil substitute or any siccative oil having properties somewhat comparable to those of linseed oil. The action of the oil is apparently primarily to coat the individual particles of magnesite with a film of oil, and to lubricate the particles and facilitate their movement against one another during the mixing operation; and during the molding under pressure this action of the oil apparently favors the entering of the minute particles of magnesite into the voids otherwise occurring between the coarser particles. The oil, by reason of its cohesive property, also serves to preliminarily bind together the particles of magnesite, and thus contributes to the successful molding of the brick. The siccative action of the oil later becomes effective to harden the oil and chemically unite or cement together the particles of magnesite. As this action proceeds, it binds the entire mass together in a coherent and homogeneous body.

The use of oil as a binder according to the present invention has the advantages over the usual use of a water bond that there is in drying no vaporization of water, and in drying by heat no possible formation of vapor or steam such as would tend to crack the brick by forcing its way out; further, because there is no formation of magnesium hydrate or other alkaline hydrates, there is a complete absence of the swelling effect which results from the subsequent breaking up of such hydrates, which is accompanied by a forcible disruptive action causing incipient cracks which result later in larger cracks, so that such disrupted bricks spall easily when in use.

While the invention finds its best application in the use of magnesite of high grade, as the sole refractory constituent of the brick, yet it is applicable with more or less admixture of other materials, such, for example, as dolomite or chrome. Excellent results have been attained with a mixture of from 70 to 90 per cent of magnesite, the remainder being chrome.

I claim as my invention:—

1. An unburned magnesite brick or like refractory composed of a magnesitic body material which has been mixed with a suitable siccative oil, molded and dried to hardness.

2. An unburned magnesite brick composed of a magnesitic body material and a binder of linseed oil, molded and dried to hardness.

3. An unburned magnesite brick or like refractory composed of a magnesitic body material of different degrees of fineness, mixed with a lubricating bonding fatty oil, molded and dried to hardness, the finer particles of the body material being within the spaces between the larger particles.

4. An unburned magnesite brick or like refractory composed of a magnesitic body material and a bond of a siccative oil having a reaction with the body material, whereby the particles of the body material are united by intervening cementitious matter and dried to hardness.

5. The method of making magnesite bricks or the like comprising mixing a pulverized magnesitic body material and a siccative oil into a plastic mass, molding and drying to hardness.

6. The method of making magnesite bricks or the like comprising mixing a magnesitic body material and linseed oil into a plastic mass, molding and drying to hardness.

7. The method of making magnesite bricks or the like consisting in mixing a pulverized magnesitic body material with a siccative oil, molding, gradually drying in a humid atmosphere, and finally drying to hardness.

8. The method of making magnesite bricks consisting in mixing a magnesitic body material with a siccative oil, molding, drying first in a humid atmosphere, and afterward diminishing the humidity of the atmosphere and drying to hardness.

9. The method of making magnesite bricks consisting in mixing a magnesitic body material with a siccative oil, molding, drying first in a humid atmosphere, and afterward diminishing the humidity of the atmosphere, while increasing the temperature and drying to hardness.

10. The method of making magnesite bricks consisting in mixing a magnesitic body material with a siccative oil, molding, gradually drying in a humid atmosphere, and afterward slowly drying to hardness in the open air.

11. The method of making magnesite bricks consisting in mixing a magnesitic body material with a siccative oil in proportion approximately 5 to 7 per cent, molding and drying to hardness.

12. The method of making magnesite bricks consisting in mixing a magnesitic body material of different degrees of fineness with a siccative fatty oil so as to coat the particles with a film of oil, molding under pressure to force the smaller particles to enter the spaces between the larger particles, and drying to hardness.

13. The method consisting in adding to dead-burned magnesite approximately five to seven per cent of linseed oil, stirring thoroughly to produce a homogeneous plastic mass wherein the particles are coated with oil, molding under pressure, and drying gradually to cause uniform cementation of the oil bond throughout the product.

In witness whereof, I have hereunto signed my name.

AUGUST MARKS.